(12) United States Patent
Cao

(10) Patent No.: US 10,961,008 B2
(45) Date of Patent: Mar. 30, 2021

(54) VESSEL DISPLAY

(71) Applicant: Cuong Cao, Essendon (AU)

(72) Inventor: Cuong Cao, Essendon (AU)

(73) Assignee: Cuong Cao, Essendon (AU)

( * ) Notice: Subject to any disclaimer, the term of this patent is extended or adjusted under 35 U.S.C. 154(b) by 145 days.

(21) Appl. No.: 16/265,665

(22) Filed: Feb. 1, 2019

(65) Prior Publication Data

US 2019/0241302 A1   Aug. 8, 2019

(30) Foreign Application Priority Data

Feb. 2, 2018 (AU) ................................ 2018900322

(51) Int. Cl.
| | | |
|---|---|---|
| *G03B 21/60* | (2014.01) | |
| *B65D 1/02* | (2006.01) | |
| *B65D 23/00* | (2006.01) | |
| *A45F 3/16* | (2006.01) | |
| *G03B 21/28* | (2006.01) | |
| *G03B 21/608* | (2014.01) | |

(52) U.S. Cl.
CPC .............. *B65D 1/0207* (2013.01); *A45F 3/16* (2013.01); *B65D 23/00* (2013.01); *G03B 21/28* (2013.01); *G03B 21/608* (2013.01)

(58) Field of Classification Search
CPC ........ G03B 21/26; G03B 21/28; G03B 21/62; G03B 21/208; G03B 21/608; G03B 21/2066; G02B 2027/014; G02B 2027/0118; G02B 2027/0127; G02B 2027/0123; G02B 2027/0138; G02B 2027/0141; G02B 2027/01187
See application file for complete search history.

(56) References Cited

U.S. PATENT DOCUMENTS

| | | | | |
|---|---|---|---|---|
| 6,254,247 B1 * | 7/2001 | Carson | ............... | A47G 19/2227 359/32 |
| 8,328,367 B2 * | 12/2012 | Nemeth | ............... | G03B 21/608 353/71 |
| 2013/0003026 A1 * | 1/2013 | Rothaar | ............. | G03B 21/2033 353/85 |
| 2014/0002329 A1 * | 1/2014 | Nishimaki | ............ | A63F 13/428 345/8 |
| 2016/0278695 A1 * | 9/2016 | Wang | ..................... | A61B 5/745 |
| 2018/0255947 A1 * | 9/2018 | Wilkinson | .......... | A47G 19/2227 |

OTHER PUBLICATIONS

Open Green Energy, DIY 3D Hologram Pyramid || Smartphone Holographic Display, YouTube video, downloaded from the Internet at:<https://www.youtube.com/watch?reload=9&v=6OjKO_5BcPo> (published Jan. 21, 2016).

* cited by examiner

*Primary Examiner* — Sultan Chowdhury
(74) *Attorney, Agent, or Firm* — Marshall, Gerstein & Borun LLP

(57) ABSTRACT

A system including a vessel having a vessel body to hold liquid, and an image source having one or more images. The vessel includes one or more partially reflective planar portions to reflect the one or more images of the image source to generate a virtual image within the vessel body based on the one or more images.

21 Claims, 8 Drawing Sheets

VESSEL DISPLAY

TECHNICAL FIELD

The invention relates to vessels for holding liquid, and systems and methods for generating displays in vessels.

BACKGROUND

Drink bottles, particularly reusable drink bottles, have become a common part of life. Drink bottles may be carried by a person and used to keep the person hydrated. For example, a person may carry a drink bottle during daily activities such as exercise, work or classes.

Drink bottles are popular with children, and may be decorated to add appeal to children. For example, drink bottles come in many appealing designs and colours. Drink bottles, and other vessels that hold liquid such as glasses or cups, may also be used for promotion of companies and merchandising, for example, for films, sports or beverage companies.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

In one aspect, a system is provided comprising: an image source comprising: one or more images; and a vessel comprising: a vessel body to hold liquid; and one or more partially reflective planar portions to reflect the one or more images to generate a virtual image within the vessel body based on the one or more images.

The vessel body may comprise a base which comprises the one or more partially reflective planar portions, for example, to reflect the one or more images when the image source is arranged below the base of the vessel body.

The base of the vessel body may comprise a flat bottom portion. The flat bottom portion may abut the image source, for example, to stably support the vessel body above the image source.

Each of the one or more partially reflective planar portions may form a trapezoid. Each trapezoid may extend between the flat bottom portion and a side of the vessel body.

The base of the vessel body may form an inverted frustum, wherein the one or more partially reflective planar portions form sides of the inverted frustum and the flat bottom portion forms a base of the inverted frustum.

The vessel may comprise a holder to hold the image source comprising the one or more images. The holder may comprise a slot to receive the image source. The slot may be located below the base of the vessel body.

In one example, the holder is attachable to the base of the vessel body. In one example, the holder is formed integrally with the vessel body.

The vessel may comprise a light source to illuminate the one or more images. In one example, the light source is arranged to backlight the one or more images. For example, the light source is located on an opposite side of the holder to the one or more partially reflective planar portions. In one example, the light source is arranged to light the one or more images reflectively. For example, the light source is located on a same side of the holder as the one or more partially reflective planar portions.

In one example, the light source is attachable to, and detachable from, the holder. In one example, the light source is formed integrally with the holder.

The image source may comprise a card comprising the one or more images.

The image source may comprise an electronic visual display comprising the one or more images.

The image source may comprise a light source to light the one or more images.

The vessel may be a drink bottle.

In another aspect, a method is provided comprising: providing one or more images by an image source; and providing a vessel comprising: a vessel body to hold liquid; and one or more partially reflective planar portions to reflect the one or more images to generate a virtual image within the vessel body based on the one or more images.

In a further aspect, a vessel is provided. The vessel comprises: a vessel body to hold liquid; and a partially reflective planar portion to reflect an image to generate a virtual image within the vessel body based on the image.

Optional features described of any aspect of the system, method and vessel, where appropriate, similarly apply to the other aspects also described here.

BRIEF DESCRIPTION OF DRAWINGS

Embodiments of the disclosure are now described by way of example with reference to the accompanying drawings. In the drawings, like reference numerals designate similar parts.

DESCRIPTION OF EMBODIMENTS

Figure 1:
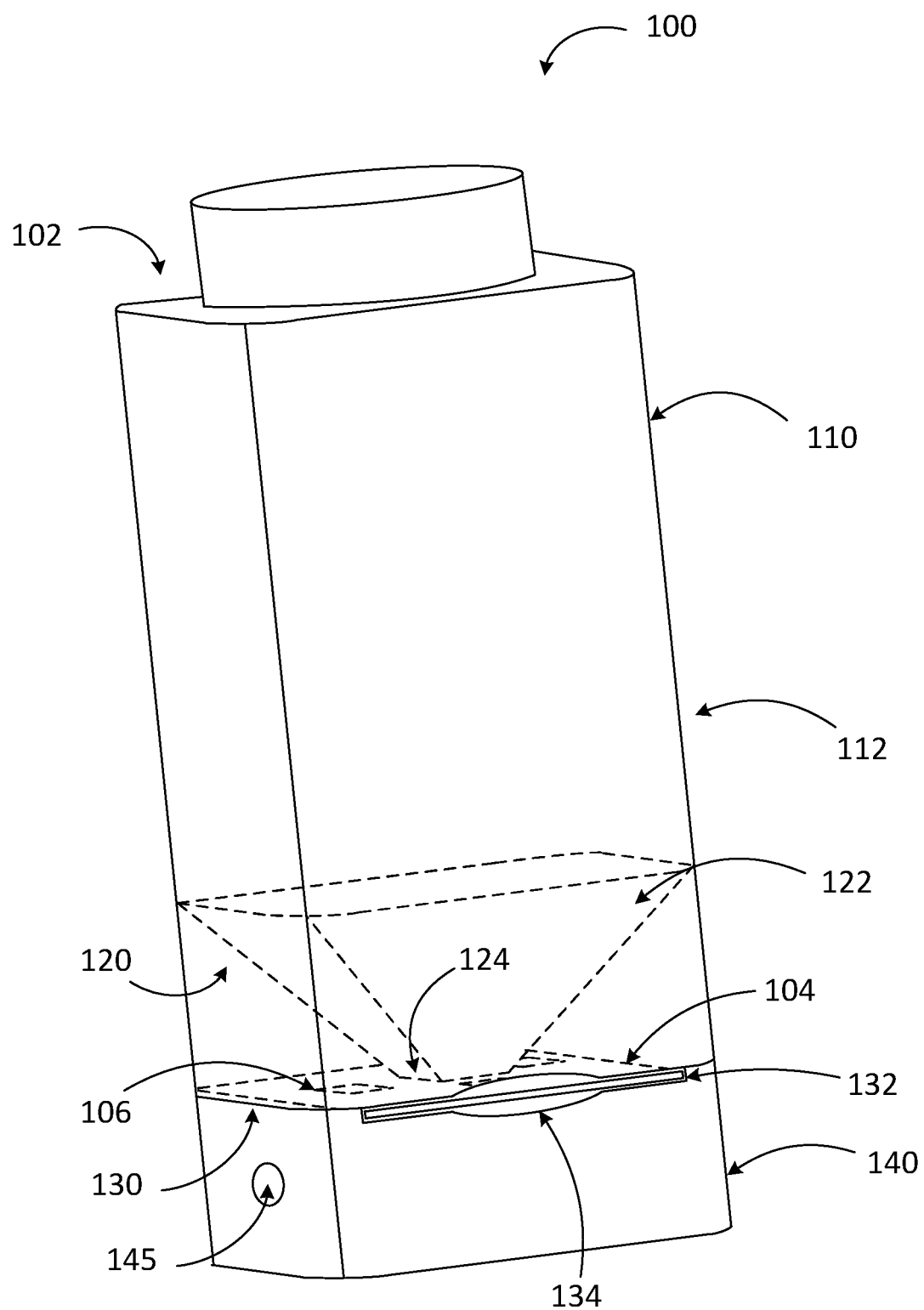
FIG. 1 illustrates a system comprising a vessel and an image source.

FIG. 1 illustrates a system 100 comprising a vessel 102 in the form of a drink bottle, and an image source 104. The image source 104 comprises images 106 and may be in the form of a card, such as a collectable card. The vessel 102 comprises a vessel body 110 to hold liquid and partially reflective planar portions 122 to reflect the images 106 to generate a virtual image within the vessel body 110 based on one or more of the images 106.

The vessel body 110 comprises a base 120 which comprises the partially reflective planar portions 122. The base 120 of the vessel body 110 also comprises a flat bottom portion 124 that may abut the image source 104. Each of the partially reflective planar portions 122 forms a trapezoid that extends between the flat bottom portion 124 and a side 112 of the vessel body 110. The base 120 of the vessel body 110 may be considered to form an inverted frustum, wherein the partially reflective planar portions 122 form sides of the inverted frustum and the flat bottom portion 124 forms a base of the inverted frustum.

The vessel 102 comprises a holder 130 to hold the image source 104. The holder 130 comprises a slot 132 to receive the image source 104. The vessel 102 comprises a recess 168 adjacent the holder 132, for example, to assist with removal of the image source 104 from the holder 130. The holder 130 may be attachable to, and detachable from, the base 120 of the vessel body 110, or the holder 130 may be formed integrally with the vessel body 110.

The vessel 102 comprises a light source 140 to illuminate the images 106. The light source 140 is located on an opposite side of the holder 130 and the image source 104 to the partially reflective planar portions 122 to backlight the images 106. However, in other embodiments, the light source may be located on a same side of the holder 130 as the reflective transparent portions 122 to light the images 106 reflectively. The light source 140 may be attachable to, and detachable from, the holder 130 or formed integrally with the holder 130.

The vessel 102 may comprise a lid (not shown). The lid can be attached to a top of the vessel body 110 to seal liquid in the vessel body 110. The lid may be, for example, any type of lid known in the art.

The vessel body 110 may be made from a transparent or translucent plastic, such as high density polyethylene (HDPE), low density polyethylene (LDPE), polyethylene terephthalate (PET), Tritan™ plastic or another drink safe plastic. A casing of the light source 140 may be made from an opaque plastic, which may be selected to be heat resistant. The lid may be made from silicone or other drink safe materials. The holder 130 may be made from any suitable material, for example, one or more of the plastics mentioned above.

Figure 2:
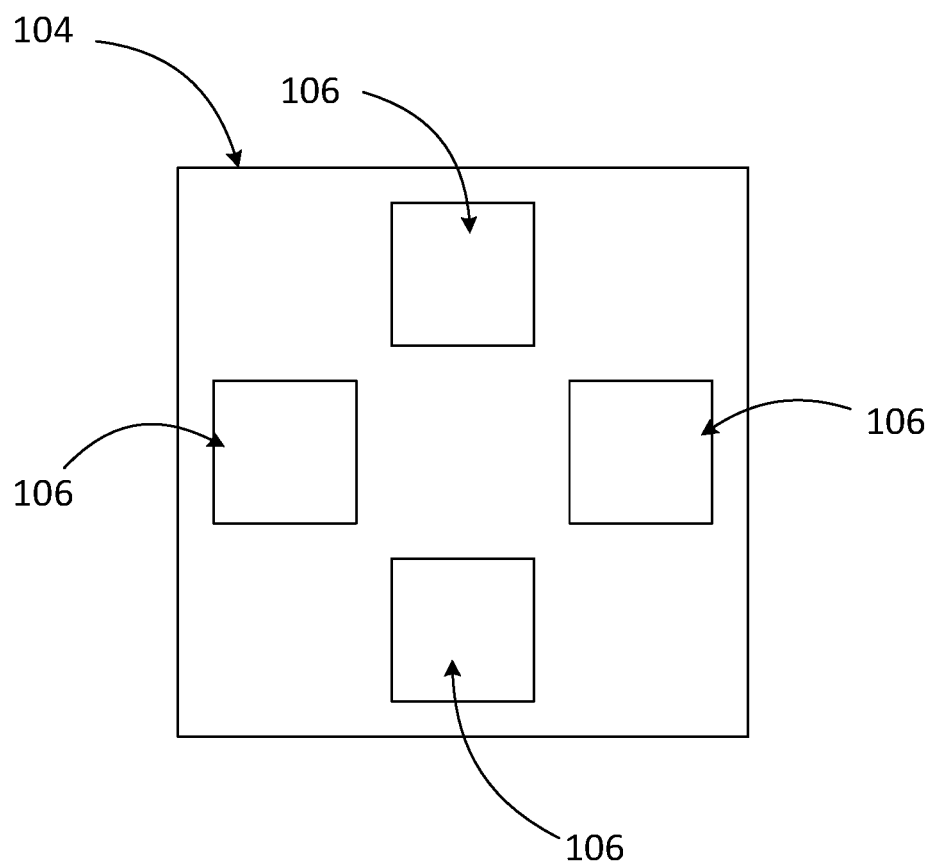
FIG. 2 illustrates a plan view of the image source.

FIG. 2 illustrates a plan view of the image source 104. The image source 104 is in the form of a card and includes one image 106 for each reflective transparent portion 122. In the example shown, there are four images 106. The card 104 may be inserted into the holder to generate a virtual image within the vessel 102 based on the images 106. In one example, the card 104 forms part of a collection of collectable cards that each produce a different virtual image in the vessel 102.

Figure 3:
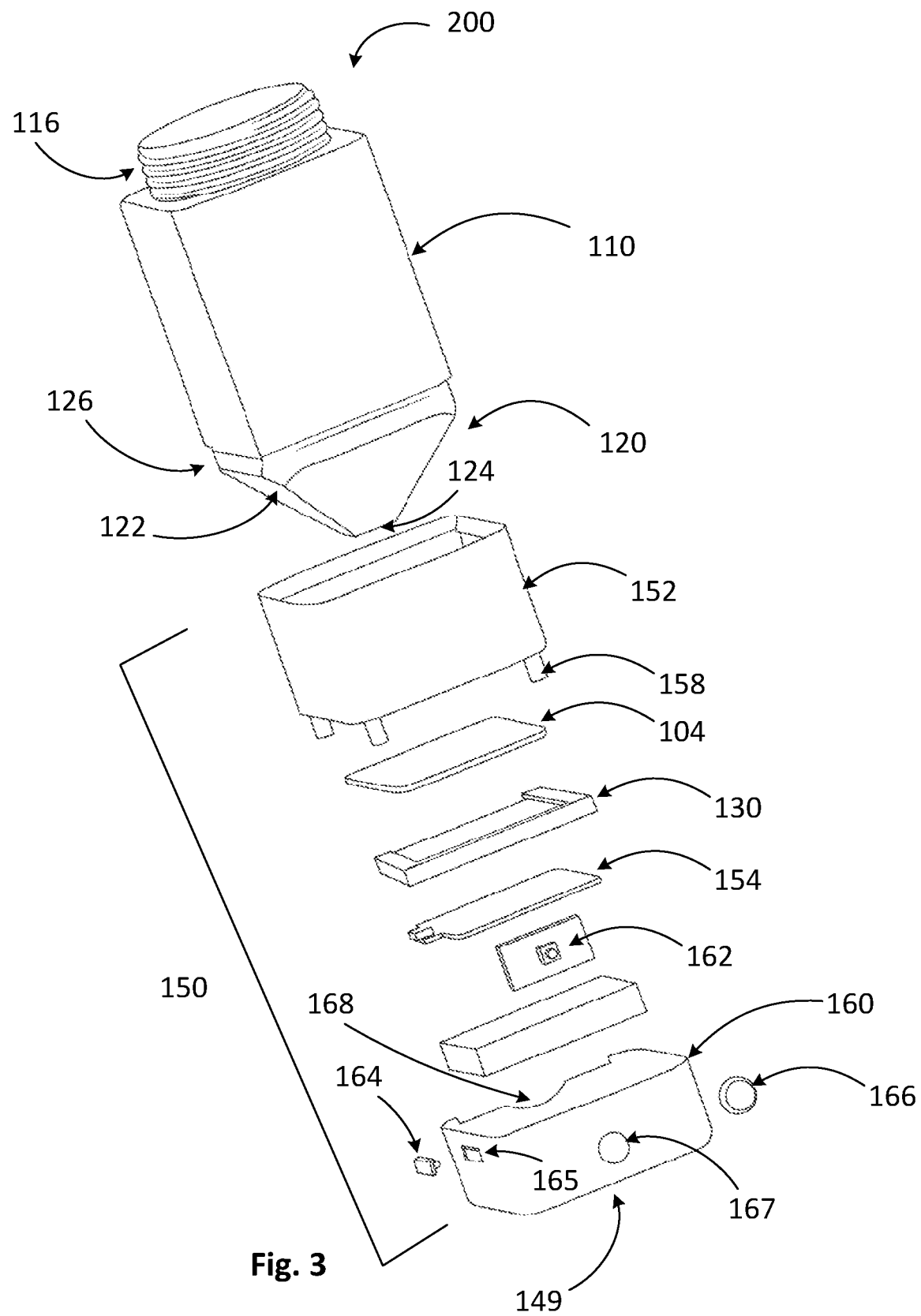
FIG. 3 illustrates an exploded perspective view of a second vessel.
Figure 4:
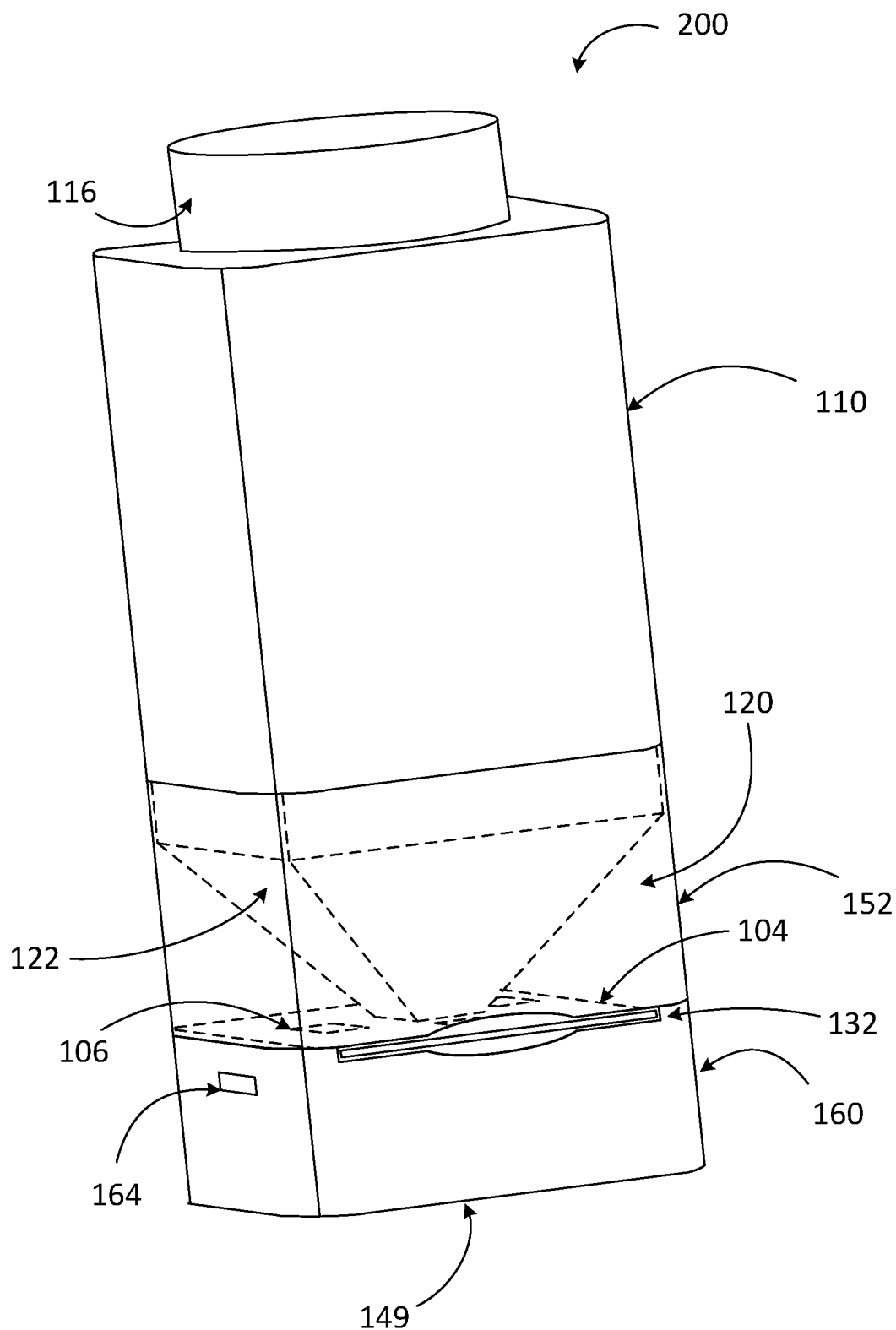
FIG. 4 illustrates a first perspective view of the second vessel.
Figure 5:
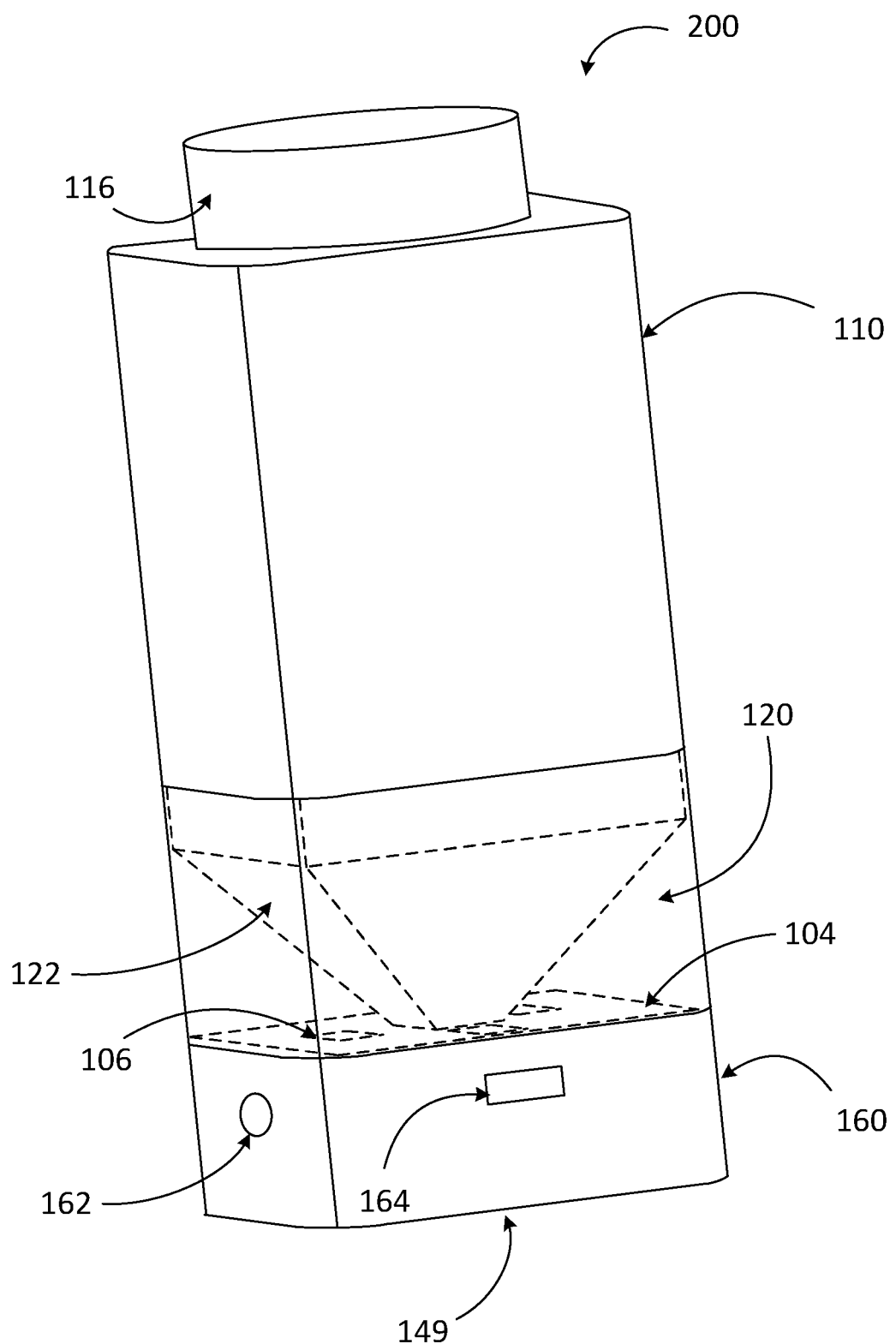
FIG. 5 illustrates a second perspective view of the second vessel.

FIG. 3 illustrates an exploded perspective view of an example vessel 200 and image source 104, FIG. 4 illustrates a first perspective view of the example vessel 200 with the image source 104 inserted, and FIG. 5 illustrates a second perspective view of the example vessel 200 with the image source 104 inserted. The vessel 200 has been rotated in the second perspective view when compared to the first perspective view.

The vessel 200 comprises a vessel body 110 and a vessel base 150 which is attachable to, and detachable from, the vessel body 110. The vessel base 150 comprises a spacer portion 152, a holder 130 to hold an image source 104, a circuit board 154, a power source 156, a switch 162, an interface port 164 and an electronics housing 160. The electronics housing 160 houses the circuit board 154 and the power source 156 to power one or more lights on the circuit board 154. The power source 156 may be, for example, a battery compartment that receives batteries to power a light on the circuit board 154. The switch 162 is connected between the power source 156 and the circuit board 154 to turn the light(s) on and off. The electronics housing 160 comprises a recess 168 to assist with removal of the image source 104 from the holder 130. The electronics housing 160 comprises a first aperture 165 for the interface port 164 and a second aperture 167 for the switch 162. The electronics housing 160 comprises a switch cover 166 to protect the switch 162, for example, from liquid, dirt and other environmental hazards. The switch cover 166 may be mounted over the second aperture 167, for example, to seal the second aperture 167. The vessel base 150, or more specifically the electronics holder 160, has a flat base 148, for example, to allow the vessel 200 to sit stably on a surface.

The interface port 164 is connected to the circuit board 154 to allow recharging of the power source 156. For example, the circuit board comprises a recharging control circuit that is connected to the power source 156. The interface port 164 may be, for example, a universal serial bus (USB) port, a micro USB port or another standard port. This may allow a user to recharge the power source 156 with their mobile phone charger or another common household charger.

The spacer portion 152 comprises mounts 158 to attach the spacer portion 152 to the electronics housing 160, for example, by screws or a clip mechanism. The mounts 158 may be used to secure the holder 130 and the circuit board 154 in the electronics housing 160. For example, the holder 130 and/or the circuit board 154 may have apertures which receive the mounts 158 or screws to hold them in place. The holder 130 forms a slot 132 between the electronics housing 160 and the spacer portion 152 when the spacer portion 152 is attached to the electronics housing 160.

The spacer portion 152 may be attached at the base 120 of the vessel body 110 by a first thread or clip portion 126 of the vessel body 110 that engages a complementary second thread or clip portion 136 of the spacer portion 152. The base 120 of the vessel body 110 may be received within the spacer portion 152. When the base 120 of the vessel body 110 is received within the spacer portion 152 the flat bottom portion 124 may abut the image source 104 in the holder 130. Light from the one or more lights on the circuit board 154 illuminates the images 106 on the image source 104.

A lid may be attached at a top end of the vessel body 110 by a third thread or clip portion 116 of the vessel body 110 that engages a complementary fourth thread or clip portion (not shown) of the lid.

In some embodiments, the holder may not form a slot. For example, the image source may be inserted into a top of the spacer portion 152 when the vessel base 150 is assembled.

Figure 6:
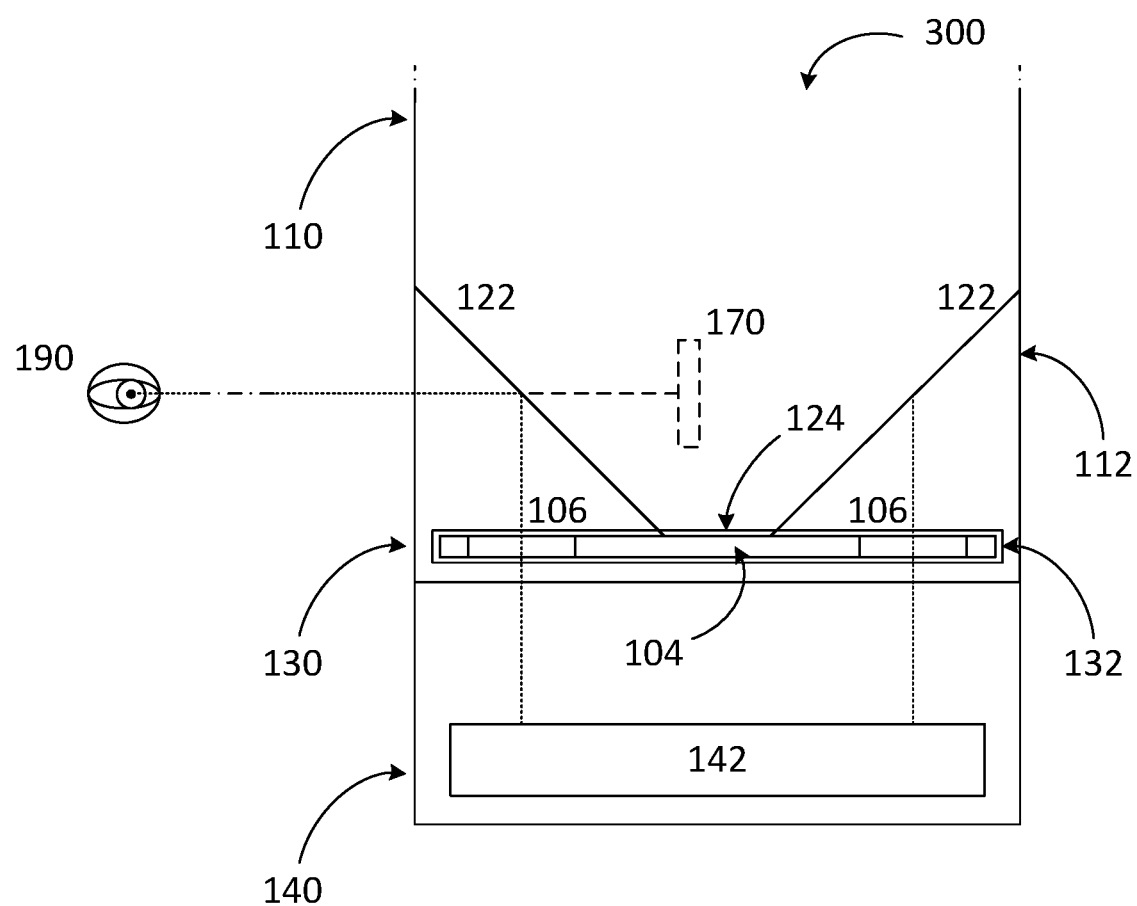
FIG. 6 illustrates a schematic of generating of a virtual image within a third example vessel.

FIG. 6 illustrates a schematic of generating of a virtual image 170 within a vessel 300 (shown in part in the figure). The vessel 300 may be, for example, a drink bottle, a drinking glass, a cup, a vase or another vessel for holding liquid. The holder 130 comprises a slot 132 that receives the image source 104. The light source 140 comprises a light 142 that backlights the images 106 on the image source 104. The images 106 on the image source 104 are each reflected by one of the partially reflective planar portions 122. An observer 190 viewing the partially reflective planar portions 122 from the side of the vessel 300 sees a virtual image 170 within the vessel 300 based on one or more of the images 106.

In the example shown in FIG. 6, the partially reflective planar portions 122 are configured at a 45 degree angle to the side 112 of the vessel body 110 and the flat bottom portion

124. This may provide best viewing of the virtual image 170 with the observer 190 looking from the side of the vessel 300.

Figure 7:
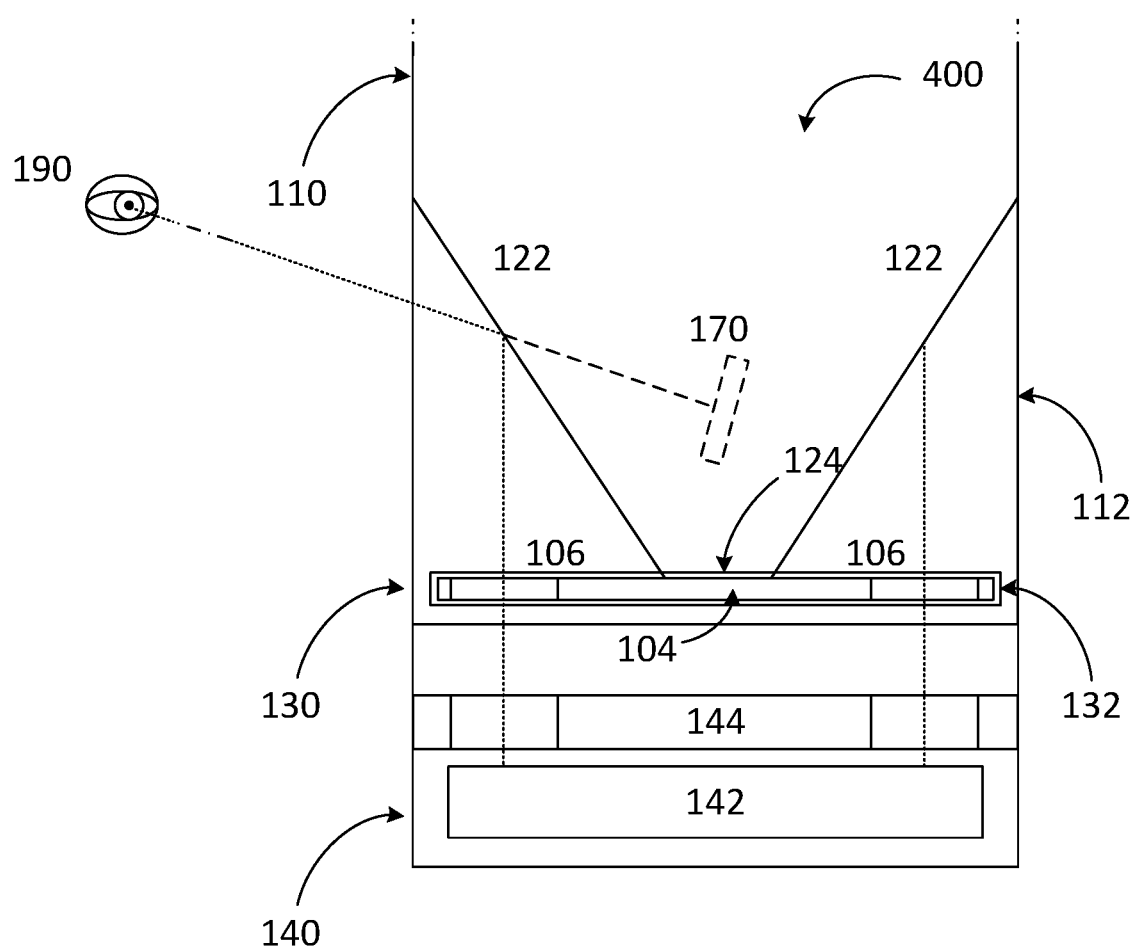
FIG. 7 illustrates a schematic of generating of a virtual image within a fourth example vessel.

FIG. 7 illustrates a second example of generating of a virtual image 170 within a vessel 400 (shown in part in the figure). The vessel 400 may be, for example, a drink bottle, a drinking glass, a cup, a vase or another vessel for holding liquid. In this example, the partially reflective planar portion 122 is arranged at a steeper angle to the flat bottom portion 124, which may improve viewing of the virtual image from a steeper viewing angle by the observer 190. For example, a steeper viewing angle may be more common for viewing the vessel on a surface or in hand.

In one example, each image 106 may formed by one or more apertures in the image source 104. The light source 140 comprises a screen 144 to prevent a direct view of the light 142 by the observer 190. The screen 144 may be black and may be made from a non-reflective material. Similarly, the image source 104 may be black in areas not covered by the images 106. The observer may then view the screen 114 through the image apertures when directly viewing the image source 104 and this will blend with the black areas of the image source 106, effectively hiding the images 106.

In one example, the light source 140 comprises multiple lights 142. For example, one light may be provided for each partially reflective planar portion 122. Parts of the light source 140 may again be coloured black to hide or obscure the images 106 when viewed directly by an observer. The light source 140 may comprise a power source to power the light(s). For example, the power source may be in the form of a battery and may be held within the light source.

Figure 8:
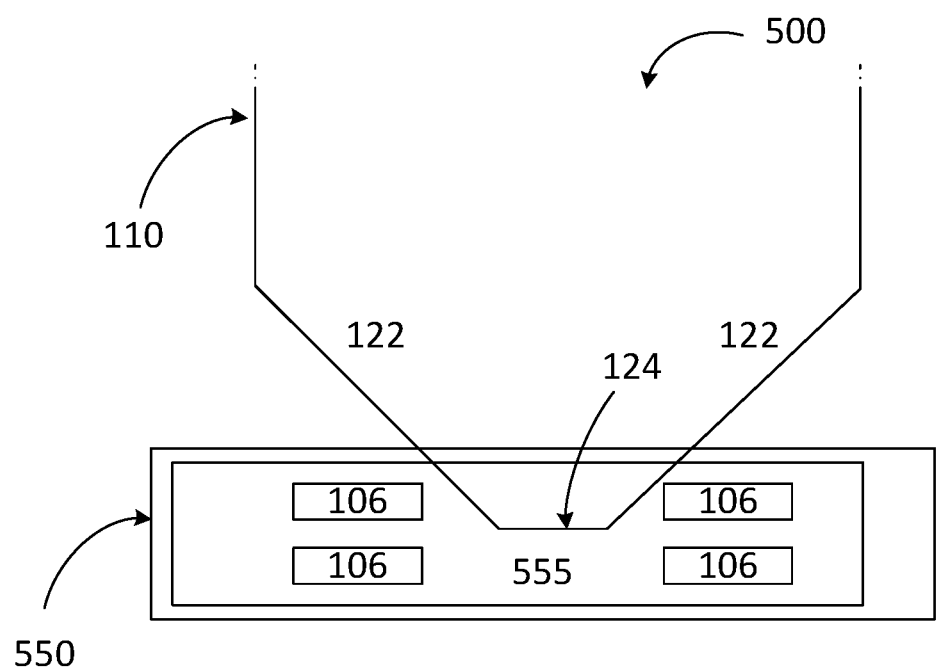
FIG. 8 illustrates a partial view of vessel on an image source.

FIG. 8 illustrates a vessel 500 (shown in part in the figure) without the holder 130 (and the light source 140). The vessel 500 may be, for example, a drink bottle, a drinking glass, a cup, a vase or another vessel for holding liquid. The vessel 500 has been rested on an electronic visual display 555, such as the display of a smartphone or a tablet 550, by resting the flat bottom portion 124 on the electronic visual display 555. The electronic visual display 555 comprises images 106 which are reflected by the partially reflective planar portion 122 to generate a virtual image within the vessel 500. The electronic visual display 555 may comprise a backlight to provide backlit images.

It will be appreciated that while a card and an electronic visual display have been provided as examples of image sources in the figures, other image sources may be used, for example, by resting the flat bottom portion 124 on the image source. The flat bottom portion may abut the image source, for example, to stably support the vessel body above the image source.

In one embodiment, a method is provided. The method comprises providing one or more images by an image source, and providing a vessel comprising a vessel body to hold liquid and one or more partially reflective planar portions to reflect the one or more images to generate a virtual image within the vessel body based on the one or more images.

In one example, the method comprises providing the one or more images to an electronic visual display 555 via a web service such as a webpage. For example, a user of a smartphone or tablet may access the webpage to view the images. In one example, the method comprises providing the one or more images to an electronic visual display 555 via downloadable software, such as an app, which displays the images on the electronic visual display 555.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

For example, while the figures show vessels with certain shapes and properties, it will be appreciated by persons skilled in the art that the disclosure may similarly be applied to other vessels or containers. In one example, the vessel may be a beer glass, a highball glass or tumbler, and the image source may be a drink coaster. In one example, the vessel may be made from glass. In another example, the vessel may be made from a transparent or translucent plastic, such as high density polyethylene (HDPE), low density polyethylene (LDPE), polyethylene terephthalate (PET), Tritan™ plastic or another drink safe plastic.

The term "virtual image" as used herein refers to a perceivable image, that appears to be within the vessel body, generated as a result of the one or more images of the image source reflecting from the one or more partially reflective planar portions. The virtual image may comprise, for example, an apparent two-dimensional or three-dimensional image. The virtual image may be a still image or a moving image, for example, where the image source comprises a screen displaying a video. The virtual image may be viewable from multiple sides of the vessel.

The invention claimed is:

1. A system comprising:
   an image source comprising:
      one or more images; and
   a vessel comprising:
      a vessel body to hold liquid, the vessel body having a transparent or translucent side; and
      one or more partially reflective, beam splitting, planar portions to reflect the one or more images to generate, to an observer viewing through the transparent or translucent side of the vessel body, a virtual image within the vessel body based on the one or more images.

2. The system of claim 1, wherein the vessel body comprises a base which comprises the one or more partially reflective, beam splitting, planar portions.

3. The system of claim 1, wherein the base of the vessel body comprises a flat bottom portion.

4. The system of claim 3, wherein the flat bottom portion supports the vessel body above the image source.

5. The system of claim 3, wherein each of the one or more partially reflective, beam splitting, planar portions forms a trapezoid.

6. The system of claim 5, wherein each trapezoid extends between the flat bottom portion and a side of the vessel body.

7. The system of claim 3, wherein the base of the vessel body forms an inverted frustum, wherein the one or more partially reflective, beam splitting, planar portions form sides of the inverted frustum and the flat bottom portion forms a base of the inverted frustum.

8. The system of claim 1, wherein the vessel comprises a holder to hold the image source.

9. The system of claim 8, wherein the holder comprises a slot to receive the image source.

10. The system of claim 9, wherein the slot is located below the base of the vessel body.

11. The system of claim 8, wherein the holder is attachable to and detachable from the base of the vessel body.

12. The system of claim 1, wherein the vessel comprises a light source to illuminate the one or more images.

13. The system of claim 12, wherein the light source is arranged to backlight the one or more images.

14. The system of claim 12, wherein the light source is arranged to light the one or more images reflectively.

15. The system of claim 12, wherein the vessel comprises a holder to hold the image source and the light source is attachable to, and detachable from, the holder.

16. The system of claim 1, wherein the image source further comprises a light source to illuminate the one or more images.

17. The system of claim 1, wherein the image source comprises a card comprising the one or more images.

18. The system of claim 1, wherein the image source comprises an electronic visual display comprising the one or more images.

19. The system of claim 1, wherein the vessel is a drink bottle.

20. A method comprising:
providing one or more images by an image source; and
providing a vessel comprising:
- a vessel body to hold liquid, the vessel body having a transparent or translucent side; and
- one or more partially reflective, beam splitting, planar portions to reflect the one or more images to generate, to an observer viewing through the transparent or translucent side of the vessel body, a virtual image within the vessel body based on the one or more images.

21. A vessel comprising:
a vessel body to hold liquid, the vessel body having a transparent or translucent side; and
a partially reflective, beam splitting, planar portion to reflect an image to generate, to an observer viewing through the transparent or translucent side of the vessel body, a virtual image within the vessel body based on the image.

* * * * *